United States Patent
Koestenblatt et al.

[11] Patent Number: 5,984,115
[45] Date of Patent: Nov. 16, 1999

[54] COMPACT DISC CASE SYSTEM

[76] Inventors: Erik D. Koestenblatt; Ken T. Doan, both of 7955 Jefferson Place Blvd., Apt. E., Baton Rouge, La. 70809

[21] Appl. No.: 09/036,653

[22] Filed: Mar. 6, 1998

[51] Int. Cl.[6] .................................................. A47F 5/00
[52] U.S. Cl. .................................... 211/40; 211/49.1
[58] Field of Search .......................... 211/40, 43, 59.3, 211/49.1; 248/162.1, 572, 123.1, 222.52, 243, 297.21, 244, 245, 581, 600; 108/136; 312/114, 71

[56] References Cited

U.S. PATENT DOCUMENTS

| | | | |
|---|---|---|---|
| 2,134,606 | 10/1938 | Hackworth et al. | 211/43 X |
| 2,291,114 | 7/1942 | Squyer | 248/581 X |
| 2,345,650 | 4/1944 | Attwood | 248/244 X |
| 2,448,171 | 8/1948 | Campbell | 211/59.3 X |
| 2,717,085 | 9/1955 | Waddington | 108/136 X |
| 2,792,268 | 5/1957 | Stanley | 108/136 |
| 2,802,575 | 8/1957 | Harrison | 312/71 X |
| 2,959,293 | 11/1960 | Van Meyer | 211/43 X |
| 2,972,207 | 2/1961 | Hiers et al. | 108/136 X |
| 2,977,168 | 3/1961 | Johnson | 108/136 X |
| 3,331,337 | 7/1967 | MacKay | 108/136 |
| 3,389,805 | 6/1968 | Yeomans | 211/43 |
| 3,402,923 | 9/1968 | Rhoads et al. | 108/136 X |
| 3,428,185 | 2/1969 | Vorndran | 211/59.3 |
| 3,860,304 | 1/1975 | Bolton | 211/59.3 X |
| 3,896,743 | 7/1975 | Pariente | 211/182 X |
| 4,135,626 | 1/1979 | Cawood | 211/43 |
| 4,161,146 | 7/1979 | Kooiman | 312/71 X |
| 4,320,932 | 3/1982 | Giffin | 312/71 |
| 4,410,157 | 10/1983 | Monti et al. | 248/297.21 X |
| 4,426,076 | 1/1984 | Palmer | 108/136 |
| 4,753,495 | 6/1988 | Swink | 312/114 |
| 4,932,522 | 6/1990 | Milovich | 206/309 |
| 5,012,936 | 5/1991 | Grum | 211/59.3 |
| 5,048,784 | 9/1991 | Schwartz et al. | 248/244 |
| 5,069,349 | 12/1991 | Wear et al. | 211/59.3 |
| 5,097,946 | 3/1992 | Emrich | 206/45.1 |
| 5,127,716 | 7/1992 | Caspers et al. | 312/9.48 |
| 5,152,590 | 10/1992 | Dukes | 312/71 |
| 5,191,977 | 3/1993 | Markovitz | 206/309 |
| 5,217,122 | 6/1993 | Martinez | 211/43 |
| 5,238,215 | 8/1993 | Jeker et al. | 248/581 X |
| 5,385,398 | 1/1995 | Huys | 312/9.48 |
| 5,393,135 | 2/1995 | Tisbo et al. | 312/9.48 |
| 5,553,707 | 9/1996 | Lion | 211/14 X |
| 5,577,620 | 11/1996 | Jacob | 211/40 |
| 5,715,948 | 2/1998 | Hung | 211/40 |
| 5,718,406 | 2/1998 | Long | 248/600 |
| 5,730,300 | 3/1998 | Chen | 211/40 |
| 5,749,477 | 5/1998 | Chang | 211/40 |
| 5,788,088 | 8/1998 | Kao | 211/40 |
| 5,855,283 | 1/1999 | Johnson | 211/59.3 |

FOREIGN PATENT DOCUMENTS

| 58400 | 1/1947 | United Kingdom | 211/24 |

*Primary Examiner*—Daniel P. Stodola
*Assistant Examiner*—Khoa Tran
*Attorney, Agent, or Firm*—Joseph N. Breaux

[57] ABSTRACT

A compact disc case system that includes at least one case unit provided with two biased support plates for supporting and gripping a number of compact disc cases therebetween. When additional case units are included the case units are interconnectable.

10 Claims, 3 Drawing Sheets

# COMPACT DISC CASE SYSTEM

TECHNICAL FIELD

The present invention relates to storage and display devices and more particularly to a compact disc case system that includes at least one case unit provided with two biased support plates for supporting and gripping a number of compact disc cases therebetween, each case unit preferably comprises three parallel oriented tubular supports, each of the three tubular supports including a support bottom portion, a support top portion, and a support middle portion, the support middle portion being positioned between the support top portion and the support bottom portion and including a central tubular shaped slide channel running the length thereof and a positioning slot formed through the sidewall thereof into connection with the slide channel; a bottom brace rigidly secured between the support bottom portions of the three tubular supports; a top brace rigidly secured between the support top portions of the three tubular supports; three attachment apertures, one formed into a top end of each of the support top portions; a first slidably mounted disc case support structure including a first support plate having three cylinder shaped anti-bind slides attached thereto by slide connecting structures, each of the three cylinder shaped anti-bind slides being slidably disposed within the tubular shaped slide channel of one of the support middle portions, each of the slide connecting structures being positioned through a positioning slot of a respective support middle portion; a second slidably mounted disc case support structure including a second support plate having three cylinder shaped anti-bind slides attached thereto by slide connecting structures, each of the three cylinder shaped anti-bind slides being slidably disposed within the tubular shaped slide channel of one of the support middle portions, each of the slide connecting structures being positioned through a positioning slot of a respective support middle portion; and a biasing system for biasing the first and second support plates toward one another with sufficient force to generate a gripping force between the first and the second support plates.

BACKGROUND ART

Collectors of compact discs typically have collections that continue to grow in number. In order to accommodate such collections, it would be a benefit to have a compact disc case system that included case units that could be interconnected to enlarge the compact disc storage capacity. Because it can be difficult to organize the compact discs for easy retrieval, it would be a benefit to have a number of case units wherein each case unit included a pair of case support plates for gripping and storing a quantity of compact discs.

GENERAL SUMMARY DISCUSSION OF INVENTION

It is thus an object of the invention to provide a compact disc case system that includes at least one case unit provided with two biased support plates for supporting and gripping a number of compact disc cases therebetween.

It is a further object of the invention to provide a compact disc case system that includes at least two interconnectable case units that each provide two support plates for supporting and gripping a number of compact disc cases therebetween.

It is a still further object of the invention to provide a compact disc case system that includes at least on e case unit comprising three parallel oriented tubular supports, each of the three tubular supports including a support bottom portion, a support top portion, and a support middle portion, the support middle portion being positioned between the support top portion and the support bottom portion and including a central tubular shaped slide channel running the length thereof and a positioning slot formed through the sidewall thereof into connection with the slide channel; a bottom brace rigidly secured between the support bottom portions of the three tubular supports; a top brace rigidly secured between the support top portions of the three tubular supports; three attachment apertures, one formed into a top end of each of the support top portions; a first slidably mounted disc case support structure including a first support plate having three cylinder shaped anti-bind slides attached thereto by slide connecting structures, each of the three cylinder shaped anti-bind slides being slidably disposed within the tubular shaped slide channel of one of the support middle portions, each of the slide connecting structures being positioned through a positioning slot of a respective support middle portion; a second slidably mounted disc case support structure including a second support plate having three cylinder shaped anti-bind slides attached thereto by slide connecting structures, each of the three cylinder shaped anti-bind slides being slidably disposed within the tubular shaped slide channel of one of the support middle portions, each of the slide connecting structures being positioned through a positioning slot of a respective support middle portion; and a biasing system for biasing the first and second support plates toward one another with sufficient force to generate a gripping force between the first and the second support plates.

It is a still further object of the invention to provide a compact disc case system as described immediately above that includes at least two interconnectable case units wherein one of the case units is provided with an enlarged bottom brace of a size sufficient to provide a base; and another of the case units is provided with three attachment rods, one extending away in parallel from the support bottom portion of each of the three tubular supports, each of the three attachment rods being sized to fit into one of the three attachment apertures.

It is a still further object of the invention to provide a compact disc case system that includes a least one unit provided with two support plates for supporting and gripping a number of compact disc cases therebetween wherein the two support plates are biased toward one another by at least two user positionable disc case support spring biasing mechanisms that each include a biasing mechanism slide cylinder having threaded securing pathway formed entirely therethrough, a compression screw threadably engaging the threaded securing pathway having a threaded rod of greater length than the diameter of the slide cylinder and a knurled knob, and a biasing spring secured at a first spring end to an end surface of the slide cylinder and at a second spring end to an anti-bind slide provided one each of the two support plates.

It is a still further object of the invention to provide a compact disc case system that accomplishes some or all of the above objects in combination.

Accordingly, a compact disc case system is provided. The compact disc case system includes at least one case unit comprising three parallel oriented tubular supports, each of the three tubular supports including a support bottom portion, a support top portion, and a support middle portion, the support middle portion being positioned between the support top portion and the support bottom portion and including a central tubular shaped slide channel running the length thereof and a positioning slot formed through the sidewall thereof into connection with the slide channel; a bottom brace rigidly secured between the support bottom portions of the three tubular supports; a top brace rigidly secured between the support top portions of the three tubular supports; three attachment apertures, one formed into a top end of each of the support top portions; a first slidably mounted disc case support structure including a first support plate having three cylinder shaped anti-bind slides attached thereto by slide connecting structures, each of the three cylinder shaped anti-bind slides being slidably disposed within the tubular shaped slide channel of one of the support middle portions, each of the slide connecting structures being positioned through a positioning slot of a respective support middle portion; a second slidably mounted disc case support structure including a second support plate having three cylinder shaped anti-bind slides attached thereto by slide connecting structures, each of the three cylinder shaped anti-bind slides being slidably disposed within the tubular shaped slide channel of one of the support middle portions, each of the slide connecting structures being positioned through a positioning slot of a respective support middle portion; and a biasing system for biasing the first and second support plates toward one another with sufficient force to generate a gripping force between the first and the second support plates. In a preferred embodiment, a first case unit is provided with an enlarged bottom brace of a size sufficient to provide a base; and a second case unit is provided that includes three attachment rods, one extending away in parallel from the support bottom portion of each of the three tubular supports, each of the three attachment rods being sized to fit into one of the three attachment apertures. In another preferred embodiment, the biasing system includes at least two user positionable disc case support spring biasing mechanisms that each include a biasing mechanism slide cylinder having a threaded securing pathway formed entirely therethrough, a compression screw threadably engaging the threaded securing pathway having a threaded rod of greater length than the diameter of the slide cylinder and a knurled knob, and a biasing spring secured at a first spring end to an end surface of the slide cylinder and at a second spring end to an anti-bind slide; each of the biasing mechanism slide cylinders being slidably positioned within the tubular shaped slide channel of one of the support middle portions; the two user positionable disc case support spring biasing mechanisms biasing the first and second support plates toward one another.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
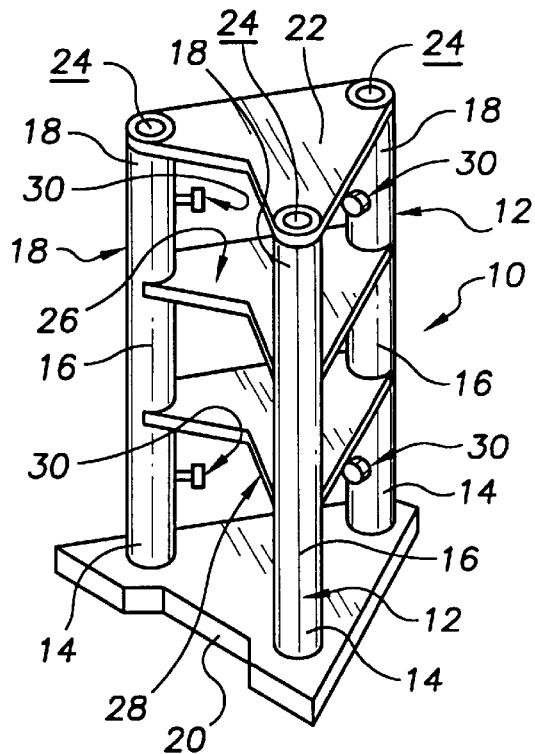
FIG. 1 is a perspective view of a first exemplary embodiment of the case unit of the compact disc case system of the present invention showing an enlarged bottom brace; the three tubular supports; the top brace; the three attachment apertures; the first slidably mounted disc case support structure; the second slidably mounted disc case support structure; and four of the six user positionable support structure spring biasing mechanisms.
Figure 2:
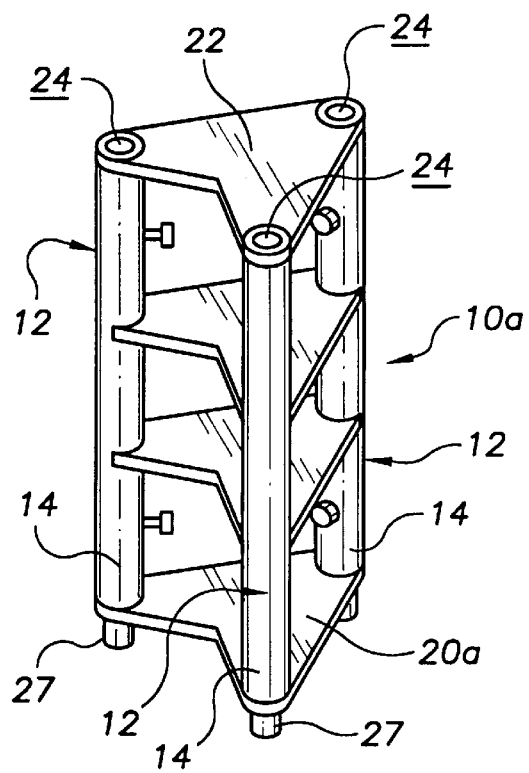
FIG. 2 is a perspective view of a second exemplary embodiment of the case unit of the compact disc case system of the present invention showing a uniformly sized bottom brace; two of the three attachment rods; the three tubular supports; the top brace; the three attachment apertures; the first slidably mounted disc case support structure; the second slidably mounted disc case support structure; and four of the six user positionable support structure spring biasing mechanisms.
Figure 3:
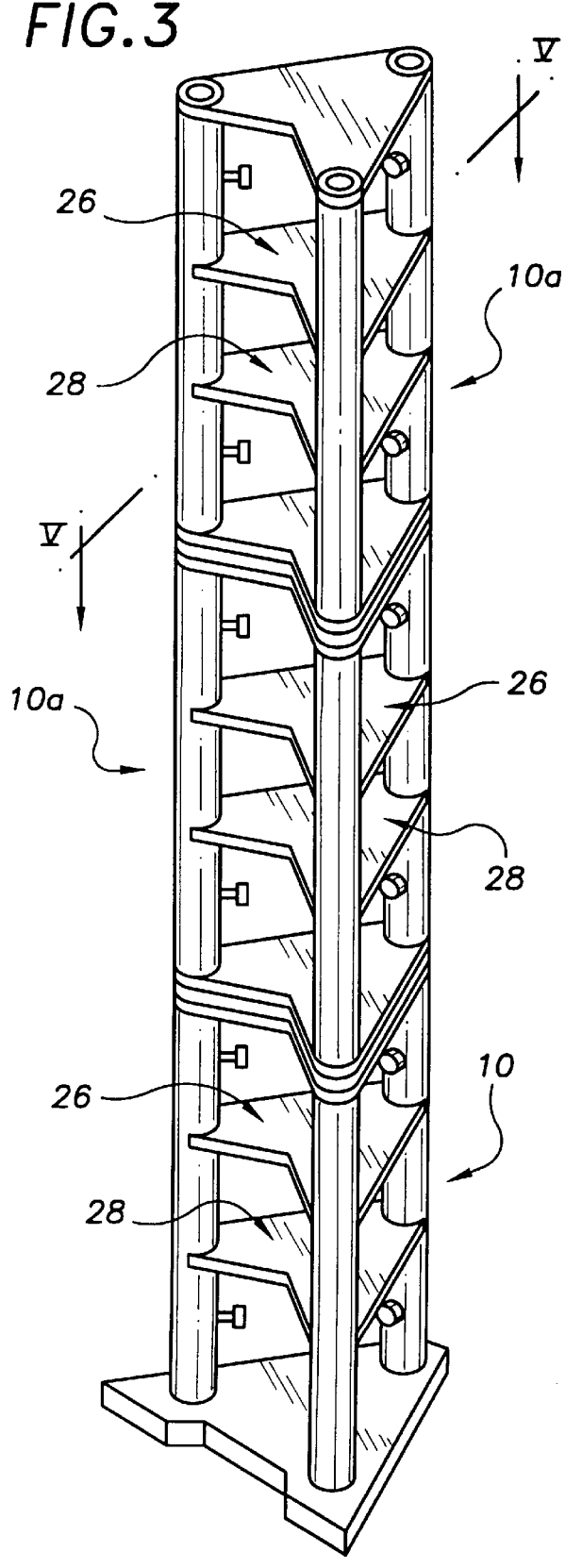
FIG. 3 is a perspective view of the first exemplary case unit of FIG. 1 in connection with two of the second exemplary case units of FIG. 2.

FIG. 1 shows a first exemplary embodiment of the case unit of the compact disc case system of the present invention, generally designated by the numeral 10. In this embodiment, case unit 10 includes three metal, parallel oriented, tubular braces, generally designated 12, each including a support bottom portion 14, a support middle portion 16, and a support top portion 18; an enlarged bottom brace 20 rigidly connected between the three support bottom portions 14 and of a size sufficient to function as a base for case unit 10; a metal top brace 22 rigidly connected between the three support top portions 18; three attachment apertures 24, one formed into an end of each support top portion 18; a first slidably mounted disc case support structure, generally designated 26; a second slidably mounted disc case support structure, generally designated 28; and six identical, user positionable support structure spring biasing mechanisms, generally designated 30 (only four shown in the Figure). FIG. 2 shows a second exemplary embodiment case unit of the compact disc case system of the present invention that is generally designated 10a. Case unit 10a is identical to case unit 10 (FIG. 1) except case unit 10a has a uniformly sized bottom brace 20a that is sized to correspond to metal top brace 22 and case unit 10a is provided with three identical cylindrical shaped attachment rods 27 (only two shown) that extend from support bottom portions 14 of tubular brace 12. Each of the attachment rods 27 extending away in parallel from its respective support bottom portion 14 and is sized to frictionally fit into a corresponding one of the three attachment apertures 24. With reference to FIG. 3 in use, case unit 10 is used as a base and additional case units 10a can be interconnected one atop the other by inserting the attachment rods 26 (FIG. 2) of the higher case unit 10a into the attachment apertures 24 (FIG. 2) of the lower case unit 10 or 10a.

Figure 4:
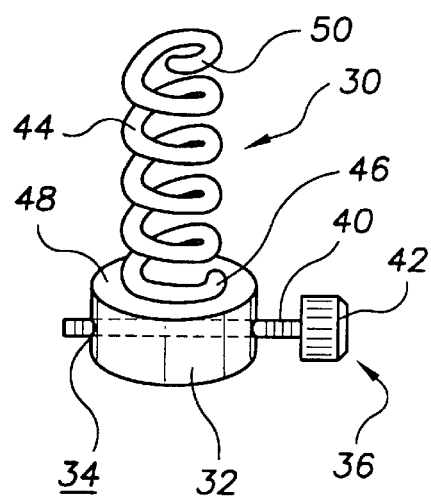
FIG. 4 is a perspective view of one of the user positionable disc case support spring biasing mechanisms in isolation showing the slide cylinder with the threaded securing pathway formed entirely therethrough, the compression screw threadably engaging the threaded securing pathway having a threaded rod of a length greater than the diameter of the slide cylinder and a knurled knob, and the biasing spring secured to an end surface of the slide cylinder.
Figure 6:
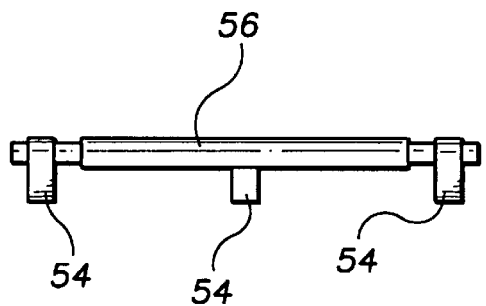
FIG. 6 is a side plan view of one of the slidably mounted disc case supports in isolation showing the support plate and the three cylinder shaped anti-bind slides.
Figure 7:
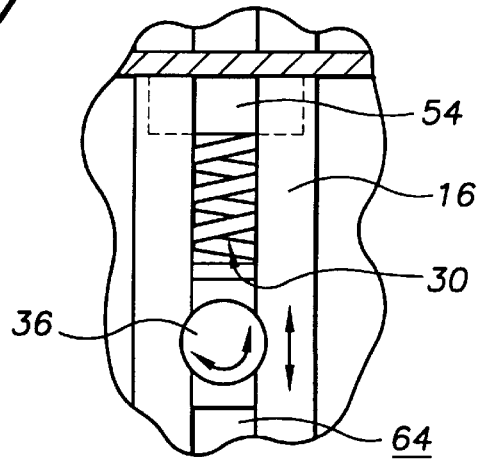
FIG. 7 is a detail plan view showing a portion of the positioning slot of one of the tubular supports, the slide cylinder and the biasing spring of a disc case support spring biasing mechanism slidably positioned within the tubular shaped slide channel of the tubular support; and a cross section through a support plate and one of the three cylinder shaped anti-bind slides of one of the slidably mounted disc case supports.

The first and second slidably mounted disc case support structures 26,28 of each case unit 10,10a are biased toward each other, respectively, by three of the six identical user positionable support structure spring biasing mechanisms 30 (FIG. 4). With reference now to FIG. 4, each spring biasing mechanism 30 includes a slide cylinder 32 having a threaded securing pathway 34 formed entirely therethrough; a compression screw, generally designated 36, threadably engaging threaded securing pathway 34 and having a threaded rod 40 of a length greater than the diameter of slide cylinder 32 and a knurled adjustment knob 42; and a biasing spring 44 secured at a first spring end 46 to an end surface 48 of slide cylinder 32 and at a second spring end 50 to an anti-bind slide 54 (FIGS. 5,6,7).

Figure 5:
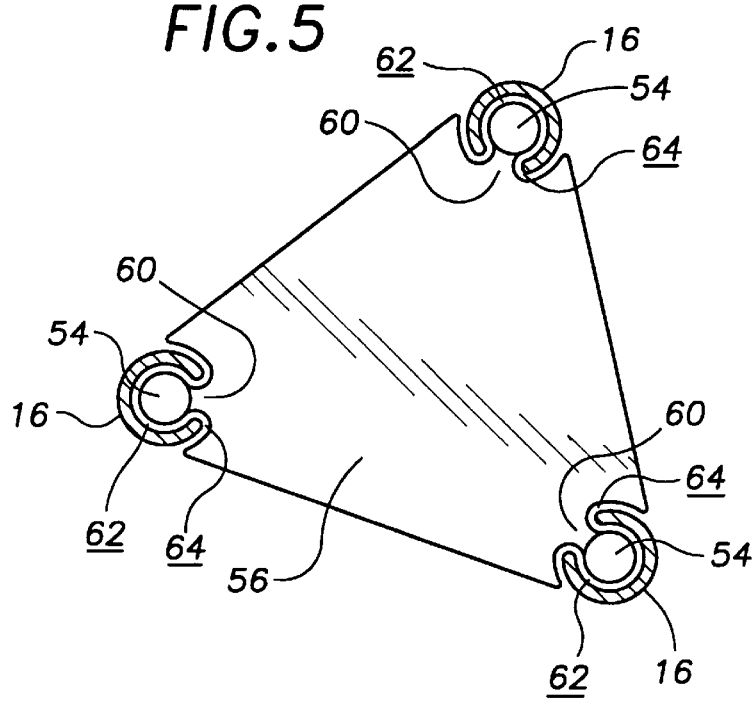
FIG. 5 is a cross section view along the line V—V of FIG. 3 showing one of the slidably mounted disc case supports with the support plate, the three cylinder shaped anti-bind slides slidably positioned within the tubular shaped slide channels of the three tubular supports and the positioning slots formed into each of the tubular supports.

With reference to FIG. 5, in this embodiment, first and second slidably mounted disc case support structures 26,28 of each case unit 10,10a (FIG. 3) are of identical construction and each includes a substantially triangular shaped support plate 56, three cylinder shaped anti-bind slides 54, and three slide connecting structure 60. With reference to FIG. 6, each cylinder shaped anti-bind slide 54 extends past support plate 56 about one-half inch and, with reference back to FIG. 5, is slidably disposed within a tubular shaped slide channel 62 formed within each support middle portion 16. Each of the three slide connecting structure 60 is slidably positioned within a positioning slot 64, with reference now to FIG. 7, formed along the length of each support middle portion 16.

It is noted that the embodiment of the compact disc case system described herein in detail for exemplary purposes is of course subject to many different variations in structure, design, application and methodology. Because many varying and different embodiments may be made within the scope of the inventive concept (s) herein taught, and because many modifications may be made in the embodiment herein detailed in accordance with the descriptive requirements of the law, it is to be understood that the details herein are to be interpreted as illustrative and not in a limiting sense.

What is claimed is:

1. A compact disc case system comprising:

at least one case unit comprising three parallel oriented tubular supports, each of said three tubular supports including a support bottom portion, a support top portion, and a support middle portion, said support middle portion being positioned between said support top portion and said support bottom portion and including a central tubular shaped slide channel running said length thereof and said positioning slot formed through said sidewall thereof into connection with said slide channel;

a bottom brace rigidly secured between said support bottom portions of said three tubular supports;

a top brace rigidly secured between said support top portions of said three tubular supports;

a first slidably mounted disc case support structure including a first support plate having three cylinder shaped anti-bind slides attached thereto by slide connecting structures, each of said three cylinder shaped anti-bind slides being slidably disposed within said tubular shaped slide channel of one of said support middle portions, each of said slide connecting structures being positioned through said positioning slot of a respective support middle portion;

a second slidably mounted disc case support structure including a second support plate having three cylinder shaped anti-bind slides attached thereto by slide connecting structures, each of said three cylinder shaped anti-bind slides being slidably disposed within said tubular shaped slide channel of one of said support middle portions, each of said slide connecting structures being positioned through said positioning slot of a respective support middle portion; and a biasing system means for biasing said first and second support plates toward one another with sufficient force to generate a gripping force between said first and said second support plates;

said biasing system means including at least two user positionable disc case support spring biasing mechanisms that each include a biasing mechanism slide cylinder having a threaded securing pathway formed entirely therethrough, a compression screw threadably engaging said threaded securing pathway having a threaded rod of greater length than said diameter of said slide cylinder and a knurled knob, and a biasing spring secured at a first spring end to an end surface of said slide cylinder and at a second spring end to an anti-bind slide provided one each of said two support plates.

2. The compact disc case system of claim 1 comprising:

said three tubular supports are formed from metal.

3. The compact disc case system of claim 2 comprising:

at least two of said case units;

one of said at least two case units being provided with an enlarged bottom brace of a size sufficient to provide a base and three attachment apertures, one formed into a top end of each of said support top portions; and another one of said at least two case units being provided with three attachment rods, one extending away in parallel from said support bottom portion of each of said three tubular supports, each of said three attachment rods being sized to fit into one of said three attachment apertures.

4. The compact disc case system of claim 2 wherein:

said biasing system means includes compression force exerting means for generating said gripping force between said first and said second support plates.

5. The compact disc case system of claim 4 wherein:

said force exerting means for generating said gripping force between said first and said second support plates are compression springs.

6. The compact disc case system of claim 1 comprising:

at least two of said case units;

one of said at least two case units being provided with an enlarged bottom brace of a size sufficient to provide a base and three attachment apertures, one formed into a top end of each of said support top portions; and another one of said at least two case units being provided with three attachment rods, one extending away in parallel from said support bottom portion of each of said three tubular supports, each of said three attachment rods being sized to fit into one of said three attachment apertures.

7. The compact disc case system of claim 6 wherein:

said biasing system means includes compression force exerting means for generating said gripping force between said first and said second support plates.

8. The compact disc case system of claim 7 wherein:

said force exerting means for generating said gripping force between said first and said second support plates are compression springs.

9. The compact disc case system of claim 1 wherein:

said biasing system means includes compression force exerting means for generating said gripping force between said first and said second support plates.

10. The compact disc case system of claim 9 wherein:

said force exerting means for generating said gripping force between said first and said second support plates are compression springs.

\* \* \* \* \*